(12) United States Patent
Weeks

(10) Patent No.: US 6,374,566 B1
(45) Date of Patent: Apr. 23, 2002

(54) INTER-CONNECTION OF ROOF TRUSSES

(75) Inventor: Kevin William Weeks, Glandore (AU)

(73) Assignee: Weeks Peacock Quality Homes Pty., Ltd., Glandore (AU)

( * ) Notice: Subject to any disclaimer, the term of this patent is extended or adjusted under 35 U.S.C. 154(b) by 0 days.

(21) Appl. No.: 09/497,882

(22) Filed: Feb. 4, 2000

(30) Foreign Application Priority Data

Feb. 4, 1999 (AU) .............................................. PP8504

(51) Int. Cl.[7] .............................................. E04H 12/10
(52) U.S. Cl. ........................ 52/655.2; 52/646; 52/650.2; 52/653.2; 52/656.9; 52/696; 403/71; 403/173; 403/231; 403/246; 403/403; 403/407.1; 211/182; 248/222.41
(58) Field of Search .......................... 52/633, 636, 638, 52/639, 641, 643, 646, 648.1, 650.2, 653.1, 653.2, 655.1, 655.2, 696, 691, 692, 695, 656.9, 289; 403/4, 170, 232.1, 173, 174, 175, 176, 297, 230, 264, 263, 257, 259, 245, 246, 330, 407.1, 344, 408.1, 292–293, 403; 211/182; 248/220.2, 224.8, 222.41

(56) References Cited

U.S. PATENT DOCUMENTS

| 3,849,012 | A | | 11/1974 | Krouse |
| 3,915,579 | A | * | 10/1975 | Offenbroich ................ 403/264 |
| 4,140,414 | A | * | 2/1979 | Buttgereit .................... 403/71 |
| 4,728,215 | A | * | 3/1988 | Martincic et al. ........... 403/231 |
| 5,114,203 | A | | 5/1992 | Carnes |
| 5,289,665 | A | * | 3/1994 | Higgins ....................... 52/721 |
| 5,295,754 | A | * | 3/1994 | Kato .......................... 403/174 |
| 5,592,789 | A | * | 1/1997 | Liddel, Sr. et al. ............. 52/63 |
| 5,806,265 | A | | 9/1998 | Sluiter |

FOREIGN PATENT DOCUMENTS

FR          2359302          2/1978

OTHER PUBLICATIONS

European Search Report, dated Mar. 26, 2001.

* cited by examiner

Primary Examiner—Carl D. Friedman
Assistant Examiner—Yvonne M. Horton
(74) Attorney, Agent, or Firm—Sonnenschein Nath & Rosenthal

(57) ABSTRACT

Roof trusses (2, 4, 6, 8) are fixed together by a snap-fit connection system. The roof truss assembly includes a first truss (2) including an aperture having an enlarged portion (26) and a slot portion (28) communicating with the enlarged portion and extending away from the enlarged portion in a slot direction and a second truss (4, 6) including a pin (22) having a neck portion (30) and a head portion (32). The enlarged portion (26) of the aperture is adapted to receive the head portion (32) of the pin (22) during converging relative movement of the trusses. Subsequent relative movement of the second truss (4, 6) in the slot direction causes the neck portion (30) of the pin (22) to be received in the slot portion (28) of the aperture whereat diverging relative movement of the trusses is prevented. The truss assembly further includes a locking member (24) for preventing reverse relative movement of the second truss (4, 6) in a direction opposite to the slot direction.

16 Claims, 7 Drawing Sheets

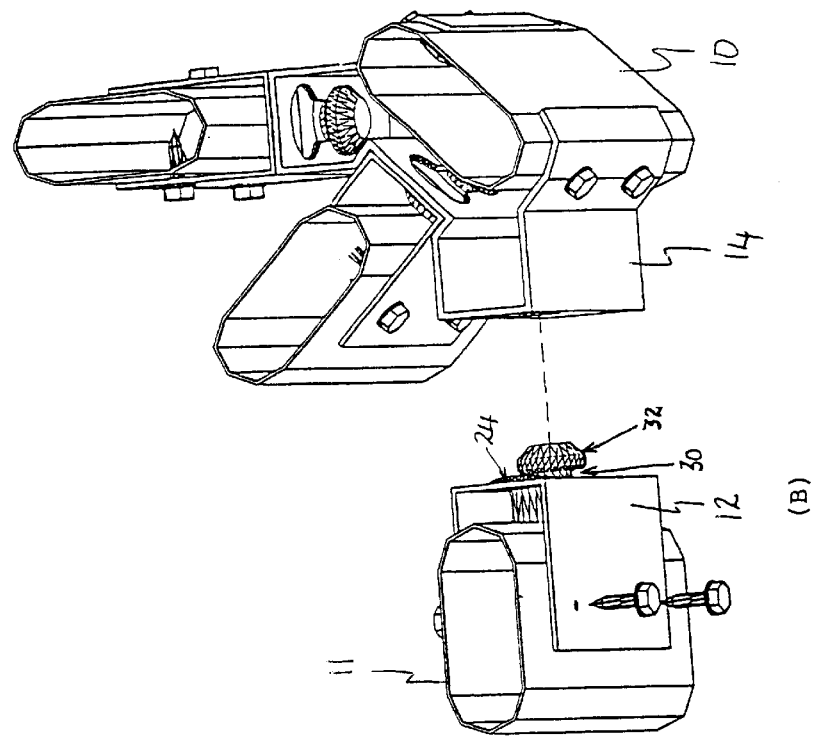
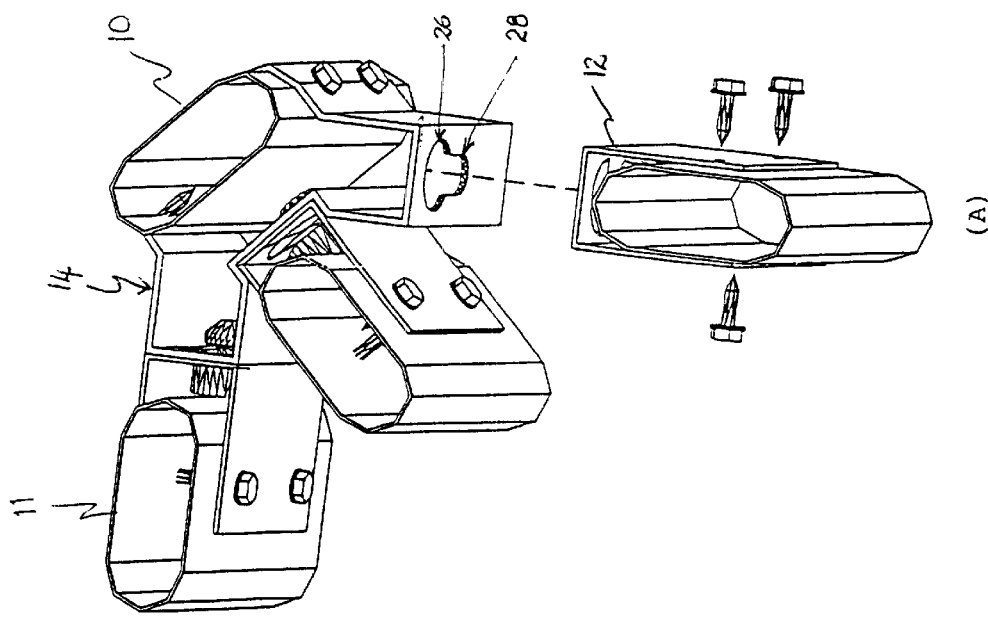
FIG 4.

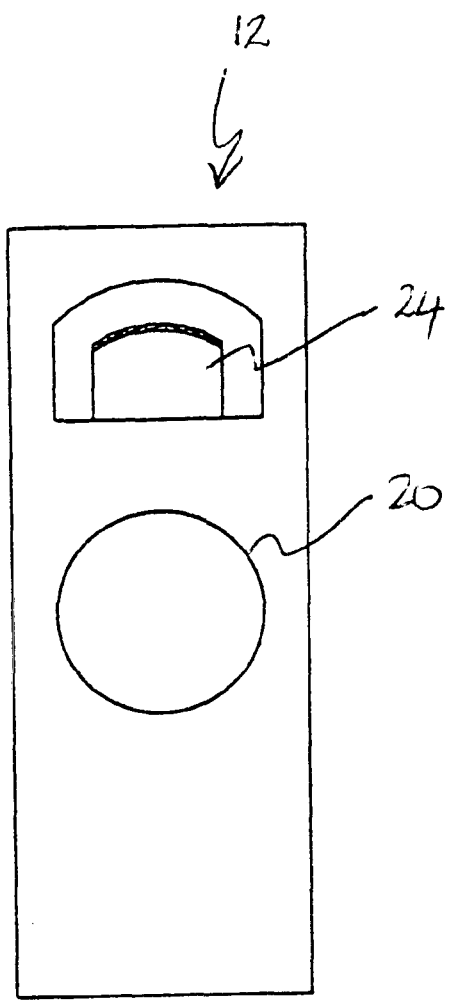
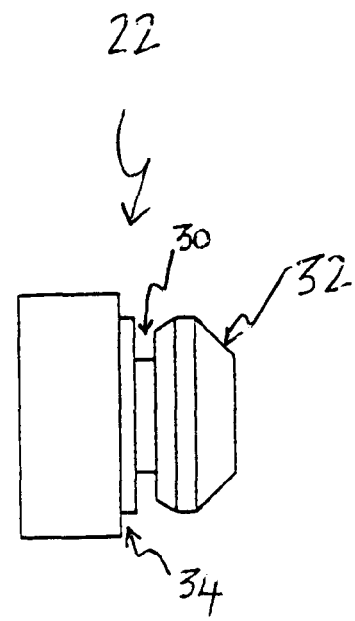
FIG 7.
FIG 8.

INTER-CONNECTION OF ROOF TRUSSES

This invention relates to the inter-connection of roof trusses.

Steel or timber roof trusses are typically fabricated in the factory, stacked flat for transport, and assembled together on site. Assembly usually involves bracing the first roof truss in position and thereafter adding further roof trusses until the roof framing is completed and self-supporting.

Whilst a gable roof, for example, generally does not involve any direct inter-connection of adjacent roof trusses, most styles of roof (eg. hipped roofs) involve direct inter-connection of adjacent roof trusses. This inter-connection of roof trusses is currently achieved utilising conventional fixing systems such as bolts, screws, nails or rivets.

Current practice in roof truss connection is labour and time intensive and the accuracy of assembly is dependent on the skill and attention of the tradesman. The present invention aims to provide a roof truss inter-connection system which requires less time, skill and attention on-site.

According to one aspect the present invention resides in a truss assembly including:

a first truss including an aperture having an enlarged portion and a slot portion communicating with the enlarged portion and extending away from the enlarged portion in a slot direction;

a second truss including a pin having a neck portion and a head portion;

wherein the enlarged portion of the aperture is adapted to receive the head portion of the pin during converging relative movement of the trusses, and wherein subsequent relative movement of the second truss in the slot direction causes the neck portion of the pin to be received in the slot portion of the aperture whereat diverging relative movement of the trusses is prevented, and wherein the truss assembly further includes a locking member for preventing reverse relative movement of the second truss in a direction opposite to the slot direction.

According to a second aspect the present invention resides in a method of assembling roof trusses, the method including:

providing a first truss including an aperture having an enlarged portion and a slot portion communicating with the enlarged portion and extending away from the enlarged portion in a slot direction;

providing a second truss including a pin having a neck portion and a head portion;

converging the first and second trusses whereby the head portion of the pin is received through the enlarged portion of the aperture and thereafter moving the second truss in the slot direction relative to the first truss whereby the neck portion of the pin enters the slot portion of the aperture; and preventing reverse relative movement of the second truss in a direction opposite to the slot direction.

Reference will now be made to the accompanying Figures in which:

FIG. 4 is a pair of perspective views of the connection of the full truss with the end truss and hip trusses of FIG. 2;

FIG. 7 is a frontal view of the male bracket; and

FIG. 8 is a side view of the pin.

Figure 1:
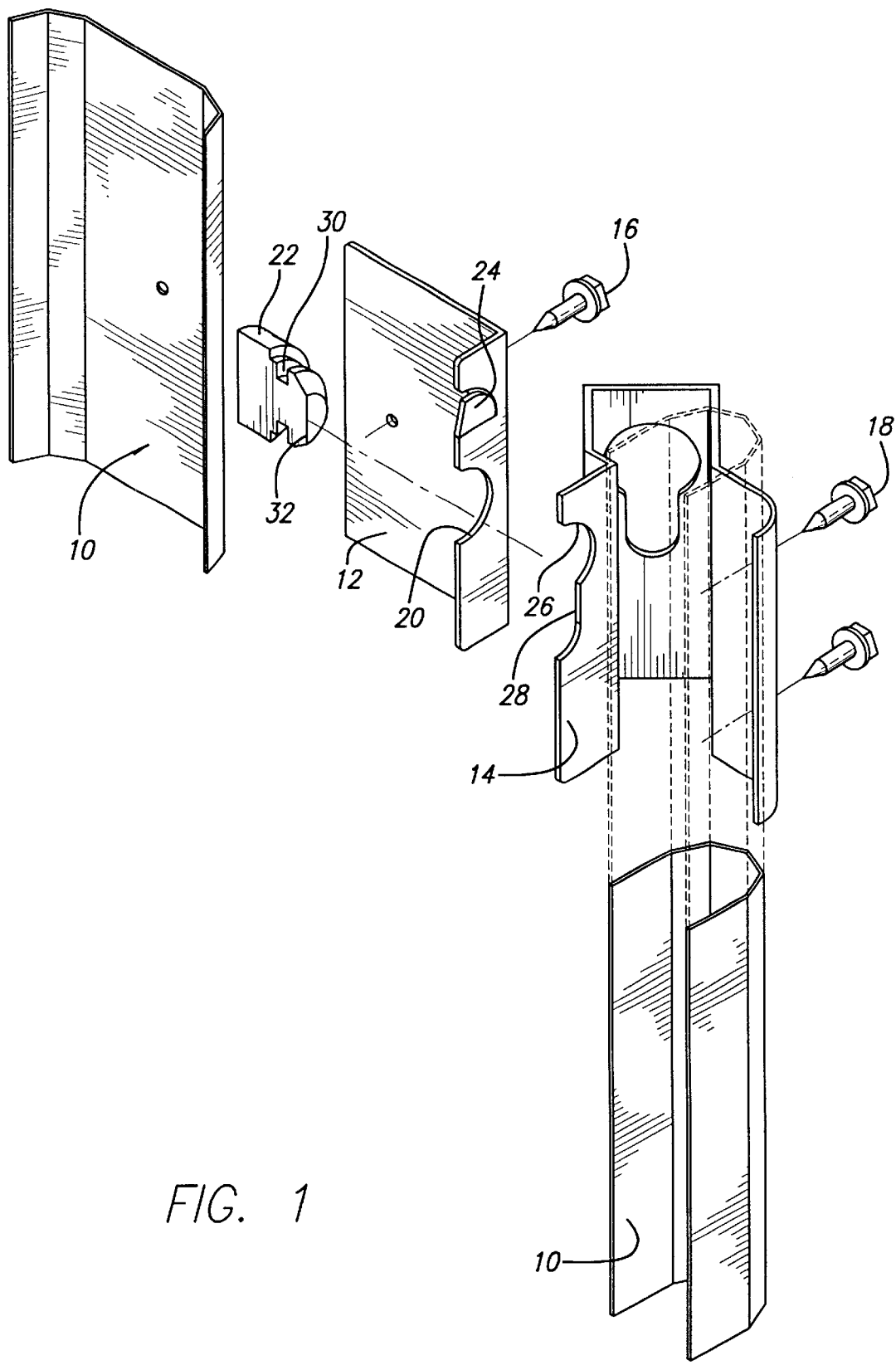
FIG. 1 is a perspective view of a typical hipped-end roof frame comprised of different types of roof trusses.

Referring firstly to FIG. 1, there is shown a perspective view of a typical hipped-end roof frame comprised of a number of different types of trusses. Specifically, the roof frame is comprised of full trusses 2 (also known as "girder" trusses or "gable" trusses), an end truss 4, hip trusses 6 and jack trusses 8.

Each full truss 2 is comprised of a pair of upper chords and a lower chord, with web members extending between the upper and lower chords in a bracing pattern as shown. There is a central upright web member 10 (sometimes known as a "king" web member) which extends from the apex of the upper chords downwardly to the mid point of the lower chord.

Each half truss (ie. end truss, hip truss or jack truss) is comprised of an upper chord and a lower chord with web members extending between the upper chord and lower chord in a bracing pattern as shown. The inner end of each half truss is defined by an upright end web member 11 (best seen in FIGS. 2 and 3) similar to the central upright web member 10 of the full truss.

As can be seen from FIG. 1, the end truss 4 and two hip trusses 6 are joined to the mid point of the full truss 2. The connection occurs at this location between the central upright web member 10 of the full truss 2 and the upright end web members 11 of the end truss 4 and hip trusses 6, respectively.

Figure 2C:
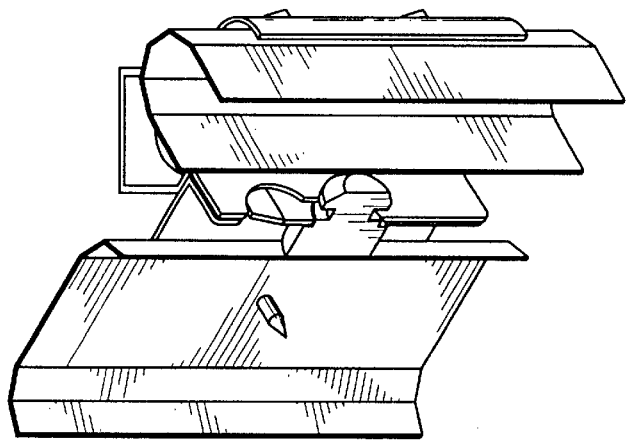
FIG. 2 is a sectioned plan view of the connection of the full truss with the end truss and hip trusses of FIG. 1.
Figure 2B:
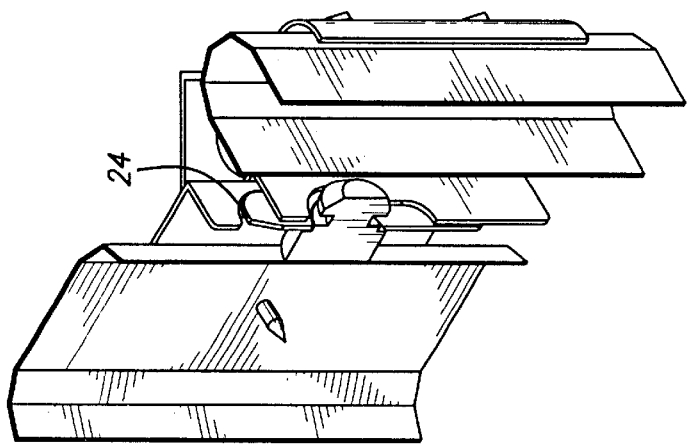
Figure 2A:
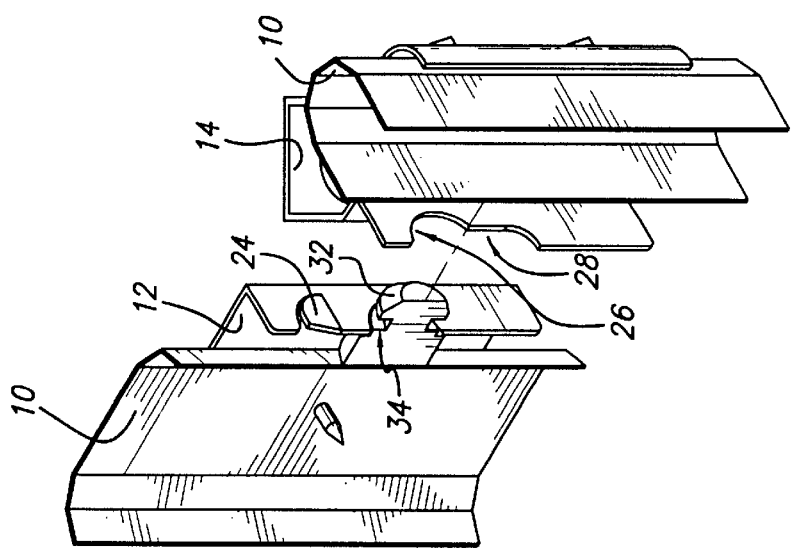

Referring now to FIG. 2, there is shown an overhead view of the connection of the two hip trusses 6 and end truss 4 with the full truss 2. Also visible are the bottom chords of the four trusses. Perspective views of the same arrangement are shown in FIG. 4.

Figure 6:
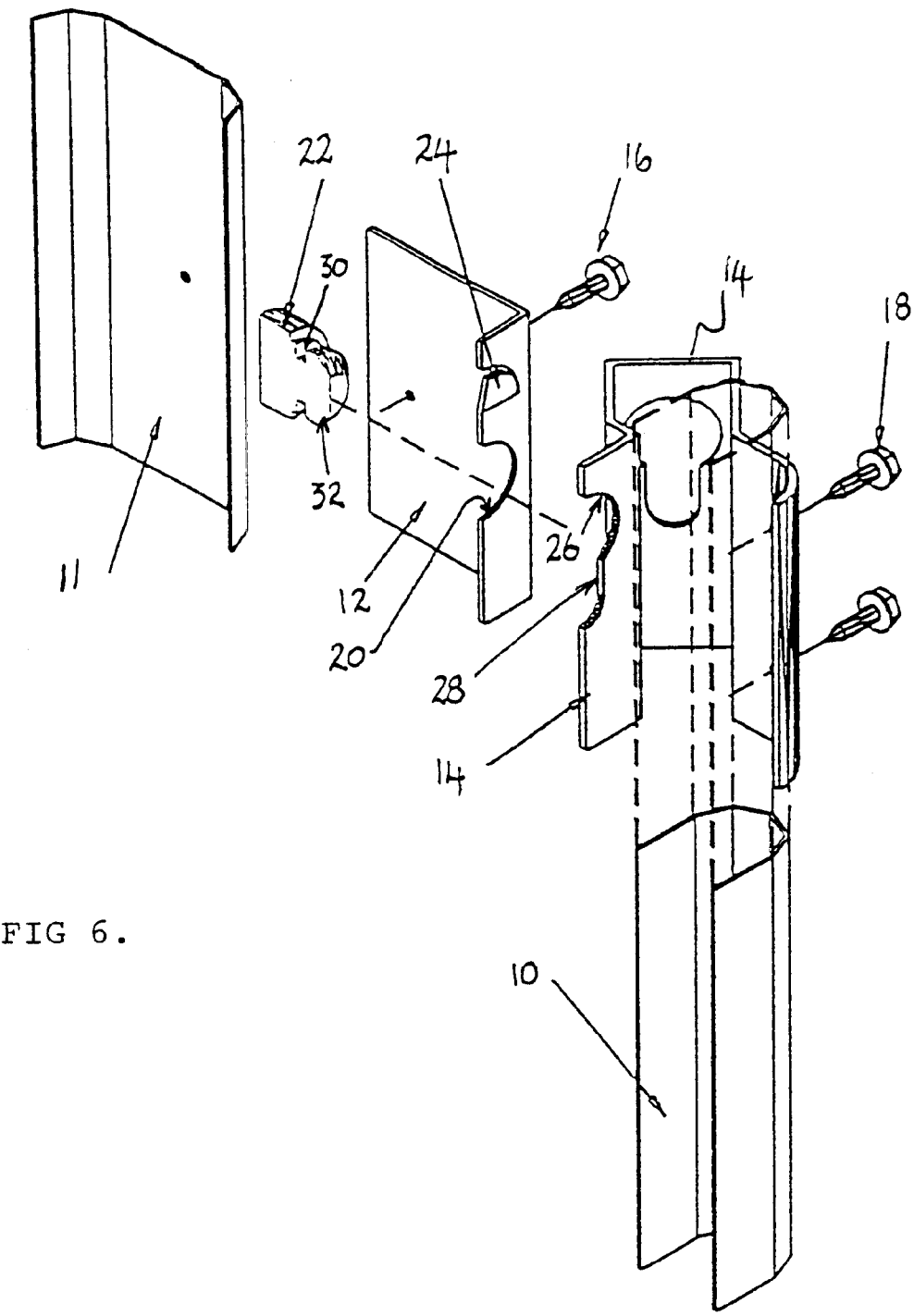
FIG. 6 is an exploded perspective sectional view of a connection assembly according to the invention.

The connection will now be described with reference to FIG. 6 which is an exploded perspective view of a connection assembly.

A female three-way bracket 14 is connected to the central web member 10 of the full truss 2 via screws 18. The female bracket 14 includes three generally key-hole shaped apertures, each aperture comprised of an enlarged portion 26 which is generally circular in shape together with a slot portion 28 which extends downwardly away from the enlarged portion 26.

A male bracket 12 is fixed to the end web member 11 of the end truss 4 via screws 16. The male bracket 12 includes a pin aperture 20 which is adapted to receive a pin 22. When the pin 22 is correctly seated within the pin aperture 20, a portion of the pin protrudes from the male bracket 12 as best shown in FIG. 4B.

The pin includes an enlarged head portion 32 and a neck portion 30 of lesser diameter than the head portion 32. The neck portion 30 extends from a shoulder portion 34 (see FIG. 8 for more detail). With reference to FIG. 8, it will also be noted that the upperside of the head portion 32 of the pin 22 is chamfered to facilitate insertion into the enlarged portion 26 of the key-hole aperture in the female bracket 14 as will be appreciated from the following description of assembly. Further, the underside of the head portion 32 of the pin 22 is chamfered to facilitate the entry of the neck portion 30 of the pin 22 into the slot portion 28 and to facilitate a close abutment of the female bracket 14 and male bracket 12.

Referring again to FIG. 6, the male bracket 12 also includes a resilient locking tab 24. The resilient locking tab 24 has been formed such that the free distal end of the tab 24 normally stands proud of the surrounding planar surface of the male bracket 12. The free end of the tab 24 can be resiliently deflected so that it is substantially co-planar with the surrounding planar surface of the male bracket 12 but will resiliently return to its default position wherein it stands proud of the surrounding planar surface of the male bracket 12.

With reference to FIG. 7, it has been found advantageous to remove material around the resilient locking tag 24 to define a clearance between the resilient locking tab 24 and the surrounding material of the male bracket 12. This ensures that the resilient locking tab will freely deflect during the connection process without interfering with the surrounding material.

Figure 5:
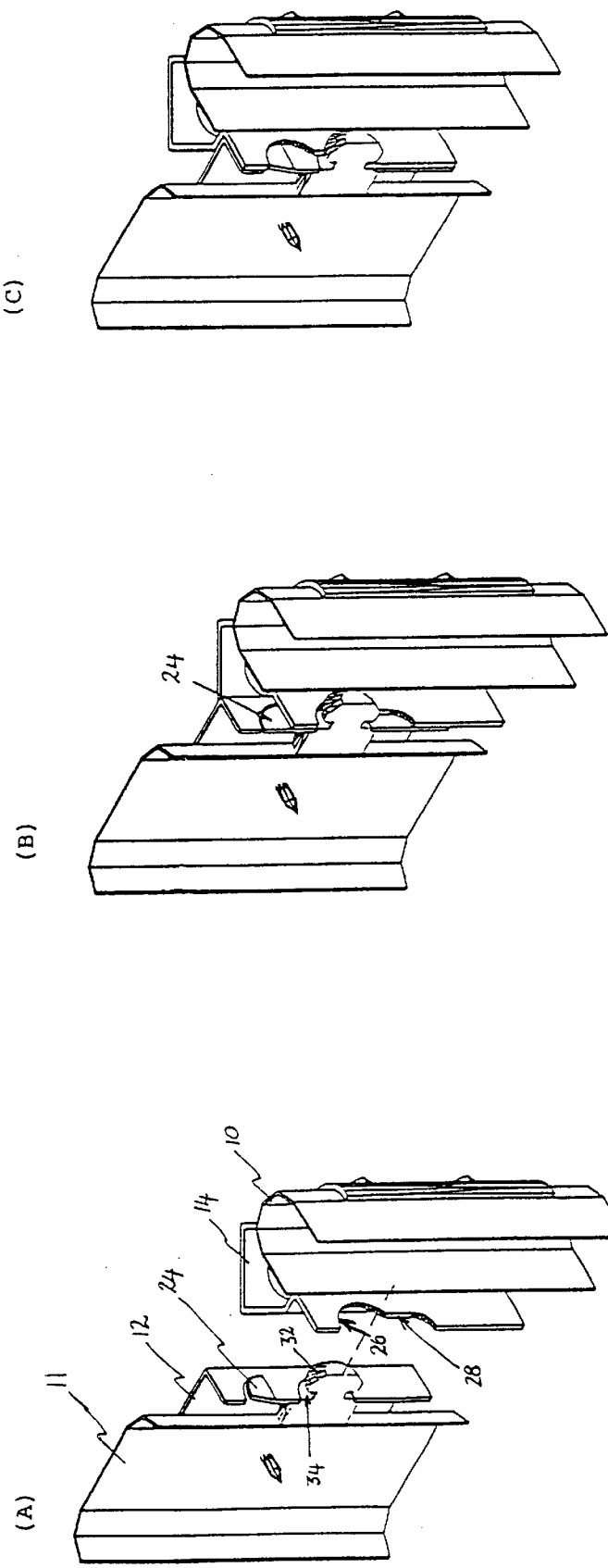
FIG. 5 is a series of three sequential perspective sectional views showing the connection of the end truss to the full truss.

The operation of the connection assembly will now be described with reference to FIG. 5.

As can be seen with reference to FIGS. 5A and 5B the respective trusses are brought together in a converging manner such that the head portion 32 of the pin 22 is received through the enlarged portion 26 of the key-hole aperture of the female bracket 14. Concurrently, the converging movement of the trusses brings the male bracket 12 and female bracket 14 into an abutting relationship. At this stage the resilient locking tab has not been deflected (see FIG. 5B).

Thereafter, referring to FIG. 5C, male bracket 12 is moved downwardly (in the slot direction) with respect to the female bracket 14 such that neck portion 30 of the pin is received within slot portion 28 of the key-hole aperture of the female bracket 14. The downward movement also causes the resilient locking tab 24 to initially become depressed and, as further downward movement occurs, the resilient locking tab 24 become aligned with enlarged portion 26 of the key-hole aperture of the female bracket 14 and the resilient nature of resilient locking tab 24 causes the resilient locking tab 24 to extend into and engage the enlarged portion 26 of the key-hole aperture of the female bracket 14 thereby preventing any reverse movement.

It should be noted that the above described connection assembly is provided at two vertically locations on each truss. Thus, the end truss or hip truss is connected to the full truss at the upper and lower ends of the central upright web member 10. Put differently, male brackets 12 are fixed to the upper and lower ends of the upright web member 10 of the full truss. Similarly, female brackets 14 are fixed to the upper and lower ends of the end or hip truss. Thus, each truss is connected to the adjacent truss at a pair of vertically spaced locations.

It will be appreciated that a number of factors make the interconnection particularly secure.

Firstly, the diameter of the neck portion 30 of the pin 22 is selected so as to be closely received in slot portion 28 of the key-hole aperture in the female bracket 14.

Secondly, the length of neck portion 30 of the pin 22 which is defined between shoulder portion 34 and head portion 28 is selected to correspond closely to the thickness of material forming the female bracket 14 (ie. the depth of the keyhole aperture) such that the planar material of the female bracket 14 surrounding the key-hole aperture is closely sandwiched between the planar male bracket 12 and head portion 32 of the pin 22. The chamfer on the underside of the head portion 32 of the pin 22 facilitates the reception of the planar material of the female bracket 14 between the head portion 32 and the planar male bracket 12.

Thirdly, the length of slot portion 28 of the key-hole aperture is such that the resilient locking tab 24 extends and engages the enlarged portion 26 of the key-hole aperture concurrently with the neck portion 30 engaging the lower-most extent of the slot portion 28.

Fourthly, the resilient locking tab 24 is complementary in shape to the enlarged portion 26. Specifically, the free-end of resilient locking tab 24 is arcuate or semi-circular in shape such that it closely engages the upper half of the enlarged portion 26 of the key-hole aperture.

Finally, as mentioned above, each truss is connected to its neighbour at two vertically spaced locations.

Referring again to FIG. 4 there is shown a three-way connection is which the end truss 4 and one hip truss 6 have already been connected to the full truss 2 and the remaining hip truss 6 is aligned and ready for connection. Again, to reiterate the connection process, the remaining hip truss 6 will be converged with the full truss 2 such that the head 32 of the pin 22 is received through the enlarged portion 26 of the key-hole aperture in the female bracket 14. Thereafter, the remaining hip truss 6 will be displaced downwardly relative to the full truss 2 such that the neck portion 30 of the pin 22 traverses the length of the slot portion 28 of the key-hole aperture in the female bracket 14. As the neck portion 30 of the pin 22 engages the lower-most extent of the slot portion 28 of the key-hole aperture, the resilient locking tab 24 aligns with the enlarged portion 26 of the key-hole aperture and the free-end of the resilient locking tab 24 expands or extends into the enlarged portion of the key-hole aperture. It will be appreciated that reverse translation of the remaining hip truss 6 is thereafter prevented by the abutment of the free-end of the resilient locking tab 24 with the enlarged portion 26 of the key-hole aperture.

Figure 3B:
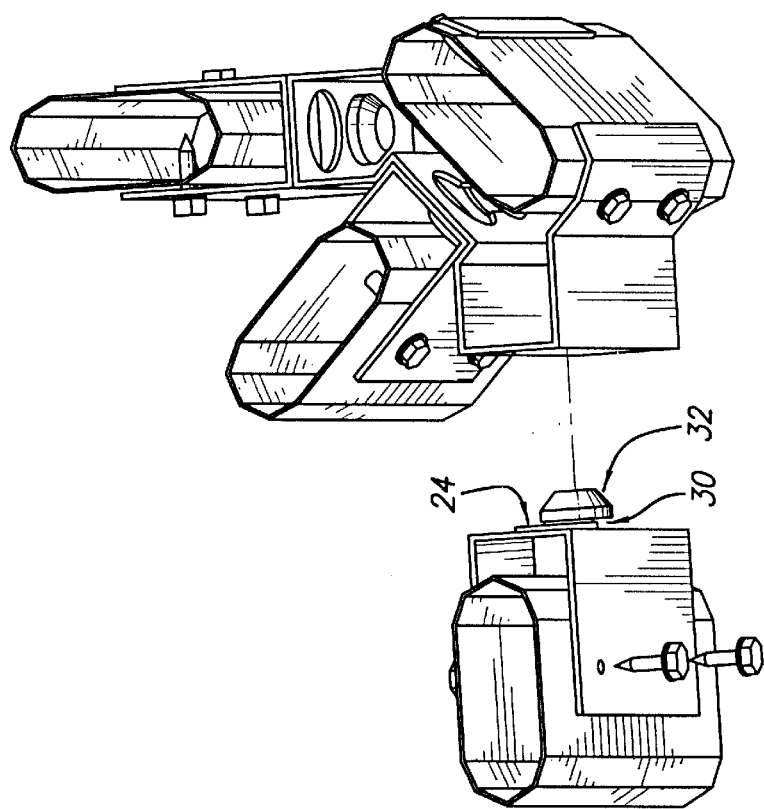
FIG. 3 is a sectioned plan view of the connection of the hip truss with the jack trusses of FIG. 1.
Figure 3A:
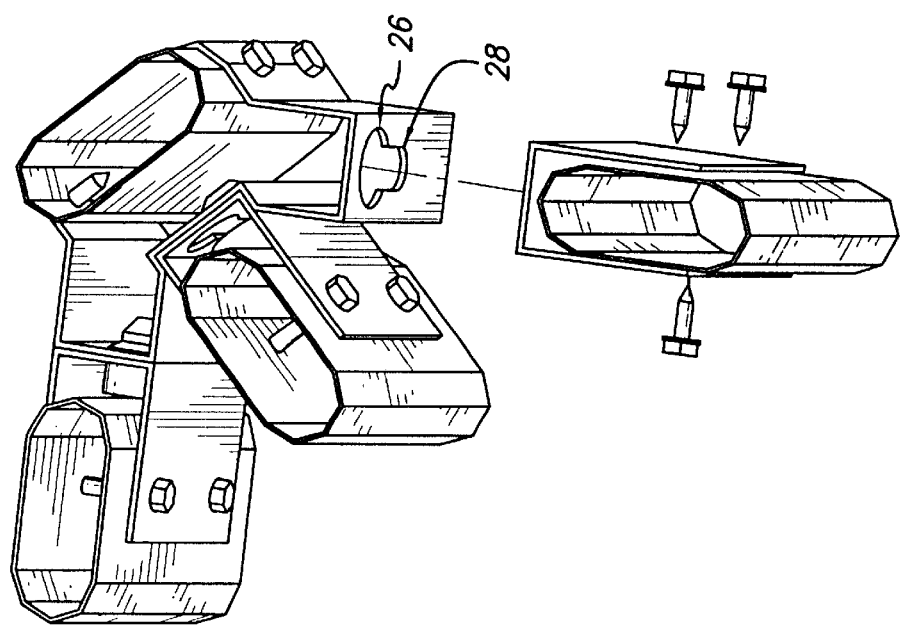

Referring now to FIG. 3, there is shown the interconnection of the hip truss with a pair of jack trusses. The connection operation is identical to that previously described except that in this case the female bracket has two key-hole shaped apertures for a two-way connection of the hip truss 6 with the two jack trusses 8. Of course, other variants having less or more connection may be utilised.

The present invention provides a connection system in which no tools are required and which is simple, quick and secure. As such it provides substantial on-site construction benefits when compared to alternative connection systems.

It will, of course, be realised that the above has been given by way of illustrative example of the invention. Any variations, modifications, or omissions, as would be apparent to persons skilled in the art, are deemed to fall within the broad scope of this invention.

The claims defining the invention are as follows:

1. A roof truss assembly including:
   a first roof truss including an aperture having an enlarged portion and a slot portion communicating with the enlarged portion and extending away from the enlarged portion in a slot direction;
   a second roof truss including a pin having a neck portion and a head portion;
   wherein the enlarged portion of the aperture is adapted to receive the head portion of the pin during converging relative movement of the roof trusses, and wherein subsequent relative movement of the second roof truss in the slot direction causes the neck portion of the pin to be receive in the slot portion of the aperture whereat diverging relative movement of the roof trusses is prevented;
   and wherein the roof truss assembly further includes a resilient locking tab for preventing reverse relative movement of the second roof truss in a direction opposite to the slot direction, the resilient locking tab located on the second roof truss and spaced from the pin in a direction opposite to the slot direction.

2. A roof truss assembly as claimed in claim 1, wherein the subsequent relative movement of the second roof truss in the slot direction causes the resilient locking tab to engage the enlarged portion of the aperture whereby reverse relative movement of the second roof truss in a direction opposite to the slot direction is prevented.

3. A roof truss assembly as claimed in claim 1, wherein the first roof truss includes a pair of vertically spaced apertures, and the second roof truss includes a complementary pair of vertically spaced pins.

4. A roof truss assembly as claimed in claim 1, wherein the slot portion of the aperture extends in a downward direction away from the enlarged portion of the aperture such that the subsequent relative movement of the second roof truss in the slot direction is assisted by gravity.

5. A roof truss assembly as claimed in claim 1, wherein the aperture is formed in a female bracket which is mounted to the first roof truss.

6. A roof truss assembly as claimed in claim 5, wherein the female bracket is mounted to a vertical web member of the first roof truss.

7. A roof truss assembly as claimed in claim 5, wherein the female bracket includes a plurality of angularly spaced apertures whereby the first roof truss can be connected to a plurality of second roof trusses.

8. A roof truss assembly as claimed in claim 1, wherein the neck portion and head portion of the pin extend from a male bracket which is mounted to the second roof truss.

9. A roof truss assembly as claimed in claim 8, wherein the male bracket is mounted to a vertical end web member of the second roof truss.

10. A roof truss assembly as claimed in claim 1, wherein the underside of the head portion of the pin includes a chamfer whereby entry of the neck portion of the pin into the slot portion of the aperture is facilitated and whereby the first roof truss and second roof truss are urged together into close abutment.

11. A roof truss assembly as claimed in claim 1, wherein the first roof truss is a full roof truss and the second roof truss is a hip roof truss or half roof truss.

12. A roof truss assembly as claimed in claim 1, wherein the first roof truss is a hip roof truss and the second roof truss is a jack roof truss.

13. A roof truss assembly as claimed in claim 8, wherein the resilient locking tab is integral with, and punched from, the male bracket.

14. A method of assembling roof trusses, the method including:

provingd a first roof truss including an aperture having an enlarged portion and a slot portion communicating with the enlarged portion and extending away from the enlarged portion in a slot direction;

providing a second roof truss including a pin having a neck portion and a head portion;

converging the first and second roof trusses whereby the head portion of the pin is received through the enlarged portion of the aperture and thereafter moving the second roof truss in the slot direction relative to the first roof truss whereby the neck portion of the pin enters the slot portion of the aperture; and preventing reverse relative movement of the second roof truss in a direction opposite to the slot direction with a resilient locking tab disposed on the second roof truss and spaced from the pin in a direction opposite to the slot direction.

15. A method as claimed in claim 14, wherein the resilient locking tag does not engage the first roof truss during the reception of the head portion of the pin in the enlarged portion of the aperture, but engages the first roof truss and is compressed by said engagement during the relative movement of the second roof truss in the slot direction.

16. A method as claimed in claim 14, wherein the slot portion of the aperture extends downwardly away from the enlarged portion of the aperture whereby the movement of the second roof truss in the slot direction relative to the first roof truss is assisted by gravity.

* * * * *